US011462738B2

(12) United States Patent
Annaka et al.

(10) Patent No.: US 11,462,738 B2
(45) Date of Patent: Oct. 4, 2022

(54) SLURRY COMPOSITION INCLUDING LITHIUM TITANIUM OXIDE AND NITRILE BUTADIENE RUBBER AND METHOD OF PRODUCING THE SAME, NEGATIVE ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventors: Koji Annaka, Tokyo (JP); Naoki Takahashi, Tokyo (JP); Tomoya Murase, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 49 days.

(21) Appl. No.: 16/470,761

(22) PCT Filed: Dec. 14, 2017

(86) PCT No.: PCT/JP2017/044971
§ 371 (c)(1),
(2) Date: Jun. 18, 2019

(87) PCT Pub. No.: WO2018/123624
PCT Pub. Date: Jul. 5, 2018

(65) Prior Publication Data
US 2019/0348681 A1 Nov. 14, 2019

(30) Foreign Application Priority Data
Dec. 28, 2016 (JP) .............................. JP2016-255804

(51) Int. Cl.
*H01M 4/62* (2006.01)
*H01M 4/131* (2010.01)
*H01M 4/485* (2010.01)
*H01M 10/0525* (2010.01)

(52) U.S. Cl.
CPC ........... *H01M 4/622* (2013.01); *H01M 4/131* (2013.01); *H01M 4/485* (2013.01); *H01M 10/0525* (2013.01)

(58) Field of Classification Search
CPC ...... H01M 4/622; H01M 4/131; H01M 4/485; H01M 10/0525
USPC .......................................... 429/217; 29/623.1
See application file for complete search history.

(56) References Cited

U.S. PATENT DOCUMENTS

| 2012/0328923 A1* | 12/2012 | Sawai | H01M 4/625 |
| | | | 429/94 |
| 2013/0059204 A1 | 3/2013 | Holzapfel et al. | |
| 2013/0244098 A1* | 9/2013 | Voillequin | H01M 4/485 |
| | | | 429/188 |
| 2013/0316235 A1 | 11/2013 | Yasuda et al. | |
| 2013/0330622 A1 | 12/2013 | Sasaki | |
| 2014/0121329 A1 | 5/2014 | Araki et al. | |
| 2015/0050554 A1 | 2/2015 | Fukumine et al. | |
| 2015/0340684 A1* | 11/2015 | Voillequin | H01M 4/0485 |
| | | | 264/319 |
| 2016/0036055 A1 | 2/2016 | Yamamoto | |
| 2016/0104880 A1* | 4/2016 | Gao | H01M 4/505 |
| | | | 429/217 |
| 2016/0340476 A1* | 11/2016 | Sonntag | H01M 4/0435 |

FOREIGN PATENT DOCUMENTS

| CN | 101710619 A | * | 5/2010 |
| CN | 103348517 A | | 10/2013 |
| CN | 105190967 A | | 12/2015 |
| JP | 2013008485 A | | 1/2013 |
| JP | 2015128013 A | | 7/2015 |
| KR | 20150022447 A | * | 3/2015 |
| KR | 20170112345 A | * | 10/2017 |
| WO | 2012115096 A1 | | 8/2012 |
| WO | 2012165120 A1 | | 12/2012 |
| WO | 2013080989 A1 | | 6/2013 |

OTHER PUBLICATIONS

ARLANXEO Performance Elastomers, THERBAN 4307 Product Specification, ARLANEXO Corporation, 2016, 1-2 (Year: 2016).*
Zeon, ZETPOL®, 2022, Zeon Europe GmbH (Year: 2022).*
Zeon, Zeon's Rubber Guide, 2012, Zeon Corporation (Year: 2012).*
Jul. 7, 2020, the Extended European Search Report issued by the European Patent Office in the corresponding European Patent Application No. 17887762.7.
Jul. 2, 2019, International Preliminary Report on Patentability issued in the International Patent Application No. PCT/JP2017/044971.

* cited by examiner

Primary Examiner — Sean P Cullen
(74) Attorney, Agent, or Firm — Kenja IP Law PC

(57) ABSTRACT

A slurry composition for a non-aqueous secondary battery negative electrode contains a negative electrode active material including lithium titanium oxide, a binder, and an organic solvent. The binder includes a copolymer that includes a nitrile group-containing monomer unit and at least one selected from an aliphatic conjugated diene monomer unit and an alkylene structural unit and that has a Mooney viscosity ($ML_{1+4}$, 100° C.) of not less than 50 and not more than 200.

9 Claims, No Drawings

SLURRY COMPOSITION INCLUDING LITHIUM TITANIUM OXIDE AND NITRILE BUTADIENE RUBBER AND METHOD OF PRODUCING THE SAME, NEGATIVE ELECTRODE FOR NON-AQUEOUS SECONDARY BATTERY, AND NON-AQUEOUS SECONDARY BATTERY

TECHNICAL FIELD

The present disclosure relates to a slurry composition for a non-aqueous secondary battery negative electrode and method of producing the same, and also to a negative electrode for a non-aqueous secondary battery and a non-aqueous secondary battery.

BACKGROUND

Secondary batteries such as lithium ion secondary batteries have characteristics such as compact size, light weight, high energy-density, and the ability to be repeatedly charged and discharged, and are used in a wide range of applications. Therefore, studies have been carried out in recent years with the objective of further raising the performance of secondary batteries through improvement of electrodes and other battery members.

An electrode used in a secondary battery such as a lithium ion secondary battery normally includes a current collector and an electrode mixed material layer (positive electrode mixed material layer or negative electrode mixed material layer) formed on the current collector. This electrode mixed material layer is formed by, for example, applying a slurry composition containing an electrode active material, a binder-containing binder composition, and so forth onto the current collector, and then drying the applied slurry composition.

Various compounds have been investigated as electrode active materials for use in negative electrodes (hereinafter, also referred to as "negative electrode active materials"). One of such compounds is lithium titanium oxide (LTO). Lithium titanium oxide displays little expansion and contraction during charging and discharging and has high electrical potential compared to lithium. Accordingly, lithium titanium oxide is advantageous for enhancing battery rate characteristics.

In recent years, attempts have been made to improve slurry compositions used in the formation of electrode mixed material layers in order to further improve secondary battery performance.

In one specific example, it has been proposed that a polymer X including 80 mass % or more of vinylidene fluoride monomer units and a polymer Y including 30 mass % to 80 mass % of hydrogenated conjugated diene monomer units may be used as a binder in a slurry composition for a secondary battery negative electrode containing lithium titanium oxide as a negative electrode active material (for example, refer to Patent Literature (PTL) 1). This slurry composition for a secondary battery negative electrode has little temporal variation in viscosity and can improve secondary battery rate characteristics and output characteristics.

CITATION LIST

Patent Literature

PTL 1: JP 2015-128013 A

SUMMARY

Technical Problem

There is room for improvement of the slurry composition for a secondary battery negative electrode according to PTL 1 in terms of further improving temporal stability of slurry viscosity and inhibiting sedimentation of solid components contained in the slurry composition (hereinafter, also referred to as sedimentation resistance). Moreover, there is room for improvement of a secondary battery produced using the slurry composition for a secondary battery negative electrode according to PTL 1 in terms of battery characteristics such as cycle characteristics and output characteristics.

Accordingly, one objective of the present disclosure is to provide a slurry composition for a non-aqueous secondary battery negative electrode that has high temporal stability of viscosity, high sedimentation resistance, and excellent slurry stability, and that when used in production of a non-aqueous secondary battery, can sufficiently improve battery characteristics of the resultant non-aqueous secondary battery, and also to provide a method of producing this slurry composition for a non-aqueous secondary battery negative electrode.

Another objective of the present disclosure is to provide a negative electrode for a non-aqueous secondary battery that can sufficiently improve battery characteristics of a non-aqueous secondary battery and a non-aqueous secondary battery that has excellent battery characteristics such as output characteristics and cycle characteristics.

Solution to Problem

The inventors conducted diligent investigation with the aim of solving the problems set forth above. As a result, the inventors discovered that slurry stability can be increased and battery characteristics of a non-aqueous secondary battery can be sufficiently improved by using a slurry composition for a non-aqueous secondary battery negative electrode that contains lithium titanium oxide as a negative electrode active material and that also contains, as a binder, a copolymer including a nitrile group-containing monomer unit and at least one selected from an aliphatic conjugated diene monomer unit and an alkylene structural unit and having a specific Mooney viscosity ($ML_{1+4}$, 100° C.). In this manner, the inventors completed the present disclosure.

Specifically, the present disclosure aims to advantageously solve the problems set forth above by disclosing a slurry composition for a non-aqueous secondary battery negative electrode comprising a negative electrode active material, a binder, and an organic solvent, wherein the negative electrode active material includes lithium titanium oxide, and the binder includes a copolymer that includes a nitrile group-containing monomer unit and at least one selected from an aliphatic conjugated diene monomer unit and an alkylene structural unit and that has a Mooney viscosity ($ML_{1+4}$, 100° C.) of not less than 50 and not more than 200. Through inclusion of lithium titanium oxide as a negative electrode active material and a copolymer including the specific monomer units set forth above and having a Mooney viscosity ($ML_{1+4}$, 100° C.) of not less than 50 and not more than 200 as a binder as set forth above, slurry stability of the slurry composition for a non-aqueous secondary battery negative electrode can be sufficiently increased, and battery characteristics of a secondary battery produced using the slurry composition for a non-aqueous secondary battery negative electrode can be sufficiently enhanced.

The "Mooney viscosity ($ML_{1+4}$, 100° C.)" referred to in the present disclosure can be measured in accordance with JIS K6300-1 at a temperature of 100° C.

The presently disclosed slurry composition for a non-aqueous secondary battery negative electrode preferably further comprises a conductive material, wherein the conductive material includes carbon fiber. Battery characteristics of a secondary battery can be further enhanced when the slurry composition for a non-aqueous secondary battery negative electrode contains carbon fiber as a conductive material.

In the presently disclosed slurry composition for a non-aqueous secondary battery negative electrode, the copolymer preferably includes the at least one selected from an aliphatic conjugated diene monomer unit and an alkylene structural unit in a proportion of not less than 20 mass % and not more than 80 mass %. Slurry stability of the slurry composition for a non-aqueous secondary battery negative electrode can be further increased and battery characteristics of a secondary battery can be further enhanced when the copolymer includes at least one selected from an aliphatic conjugated diene monomer unit and an alkylene structural unit in a proportion of not less than 20 mass % and not more than 80 mass %.

In the present disclosure, the "proportion constituted by each repeating unit (structural unit or monomer unit) in a copolymer" can be measured using a nuclear magnetic resonance (NMR) method such as $^1$H-NMR.

In the presently disclosed slurry composition for a non-aqueous secondary battery negative electrode, the copolymer preferably includes the nitrile group-containing monomer unit in a proportion of not less than 10 mass % and not more than 55 mass %. Peel strength and flexibility of an electrode mixed material layer formed using the slurry composition for a secondary battery electrode can be increased when the copolymer includes a nitrile group-containing monomer unit in a proportion of not less than 10 mass % and not more than 55 mass %.

In the presently disclosed slurry composition for a non-aqueous secondary battery negative electrode, the binder may include a polymer that includes 80 mass % or more of fluorine atoms in a proportion of 40 mass % or less per 100 mass %, in total, of the binder. In a case in which a polymer including 80 mass % or more of fluorine atoms is included, slurry stability can be further increased and battery characteristics of a secondary battery can be further enhanced so long as the percentage content of this polymer is 40 mass % or less among the overall binder.

Moreover, the present disclosure aims to advantageously solve the problems set forth above by disclosing a negative electrode for a non-aqueous secondary battery comprising an electrode mixed material layer formed using any one of the slurry compositions for a non-aqueous secondary battery negative electrode set forth above. The use of any one of the slurry compositions for a non-aqueous secondary battery negative electrode set forth above in this manner enables favorable formation of an electrode mixed material layer and sufficient improvement of battery characteristics of a secondary battery in which the negative electrode for a non-aqueous secondary battery is used.

Furthermore, the present disclosure aims to advantageously solve the problems set forth above by disclosing a secondary battery comprising the negative electrode for a non-aqueous secondary battery set forth above. Battery characteristics such as output characteristics and cycle characteristics can be sufficiently improved by using the negative electrode for a non-aqueous secondary battery set forth above in this manner.

Also, the present disclosure aims to advantageously solve the problems set forth above by disclosing a method of producing a slurry composition for a non-aqueous secondary battery negative electrode containing a negative electrode active material, a binder, and an organic solvent, wherein the negative electrode active material includes lithium titanium oxide, and the binder includes a copolymer that includes a nitrile group-containing monomer unit and at least one selected from an aliphatic conjugated diene monomer unit and an alkylene structural unit and that has a Mooney viscosity ($ML_{1+4}$, 100° C.) of not less than 50 and not more than 200, the method of producing the slurry composition for a non-aqueous secondary battery negative electrode comprising: a step A of mixing the binder and the organic solvent to obtain a mixture; and a step B of mixing the negative electrode active material and the mixture. These steps A and B enable favorable production of the slurry composition for a non-aqueous secondary battery negative electrode.

Advantageous Effect

According to the present disclosure, it is possible to provide a slurry composition for a non-aqueous secondary battery negative electrode that has high slurry stability and can sufficiently improve battery characteristics of a secondary battery, and also to provide a method of producing this slurry composition for a non-aqueous secondary battery negative electrode.

Moreover, according to the present disclosure, it is possible to provide a negative electrode for a non-aqueous secondary battery that can sufficiently improve battery characteristics of a non-aqueous secondary battery and a non-aqueous secondary battery that has excellent battery characteristics such as output characteristics and cycle characteristics.

DETAILED DESCRIPTION

The following provides a detailed description of embodiments of the present disclosure.

The presently disclosed slurry composition for a non-aqueous secondary battery negative electrode can be used in formation of a negative electrode of a secondary battery such as a lithium ion secondary battery. Moreover, the presently disclosed non-aqueous secondary battery uses a negative electrode for a non-aqueous secondary battery formed using the presently disclosed slurry composition for a non-aqueous secondary battery negative electrode.

(Slurry Composition for Non-Aqueous Secondary Battery Negative Electrode)

The presently disclosed slurry composition for a non-aqueous secondary battery negative electrode contains a negative electrode active material, a binder, and an organic solvent, and may optionally further contain a conductive material and other components that can be compounded in negative electrodes of non-aqueous secondary batteries. Features of the presently disclosed slurry composition for a non-aqueous secondary battery negative electrode are that the negative electrode active material includes lithium titanium oxide and the binder includes a copolymer that includes a nitrile group-containing monomer unit and at least one selected from an aliphatic conjugated diene monomer unit and an alkylene structural unit and that has a Mooney viscosity ($ML_{1+4}$, 100° C.) of not less than 50 and not more than 200.

As a result of the binder including a nitrile group-containing monomer unit and at least one selected from an aliphatic conjugated diene monomer unit and an alkylene structural unit, the presently disclosed slurry composition for a non-aqueous secondary battery negative electrode has high slurry stability and can improve output characteristics of a secondary battery when used in production thereof. The presently disclosed slurry composition for a non-aqueous secondary battery negative electrode also has high slurry stability as a result of containing a copolymer having a Mooney viscosity ($ML_{1+4}$, 100° C.) of 50 or more as the binder. Furthermore, the presently disclosed slurry composition for a non-aqueous secondary battery negative electrode can improve battery characteristics such as output characteristics and cycle characteristics of a secondary battery as a result of containing a copolymer having a Mooney viscosity ($ML_{1+4}$, 100° C.) of 200 or less as the binder.

<Negative Electrode Active Material>

The negative electrode active material is a material that accepts and donates electrons in a negative electrode of a secondary battery. In the case of a lithium ion secondary battery, for example, the negative electrode active material is normally a material that can occlude and release lithium. The presently disclosed slurry composition for a non-aqueous secondary battery negative electrode is required to contain lithium titanium oxide (hereinafter, also referred to as "LTO") as the negative electrode active material and may optionally further contain known electrode active materials that can be used in negative electrodes such as carbon-based negative electrode active materials and non-carbon-based negative electrode active materials.

[Lithium Titanium Oxide (LTO)]

LTO is a compound containing lithium, titanium, and oxygen, and is normally a compound including a crystal structure having a chemical composition indicated by $Li_xTi_yM_zO_4$. In the preceding chemical formula, x, y, and z satisfy $0.7 \leq x \leq 1.5$, $1.5 \leq y \leq 2.3$, and $0 \leq z \leq 1.6$, and M represents an element selected from the group consisting of Na, K, Co, Al, Fe, Ti, Mg, Cr, Ga, Cu, Zn, and Nb. The proportions constituted by lithium and titanium in LTO can be measured by a commonly known method.

A preferable example of LTO is spinel lithium titanate (chemical formula: $Li_{4+x}Ti_5O_{12}$ ($0 \leq x \leq 3$); $Li_4Ti_5O_{12}$ is particularly preferable). Spinel lithium titanate can be synthesized by mixing lithium hydroxide and titanium dioxide and then baking the resultant mixture.

In the presently disclosed slurry composition for a non-aqueous secondary battery negative electrode, some or all of the LTO is normally present in a particulate form. The LTO particles may be spherical secondary particles formed from primary particles. The volume-average diameter of the secondary particles may be 1 μm to 100 μm. The volume-average particle diameter of the primary particles is normally less than 1 μm.

Each of the LTO particles may be composed solely of LTO or may contain LTO and a substance other than LTO. For example, the LTO particles may contain LTO and a carbon material. The LTO particles are preferably particles that each contain LTO and a layer of a carbon material coating the LTO. In the following description, the abbreviated term "carbon material-coated LTO particles" is used when referring to particles containing LTO and a layer of a carbon material coating the LTO, in particular, among LTO particles. Note that in the case of carbon material-coated LTO particles, the carbon material coating the surface functions like a conductive material, whereas LTO particles forming cores function as a negative electrode active material.

The carbon material is present on at least part of the surface of the carbon material-coated LTO particles. In other words, it is not essential that the carbon material coats the entire surface of the particles in the carbon material-coated LTO particles, and may coat just part of the surface of the particles. Known methods can be adopted as the method by which the carbon material-coated LTO particles are produced without any specific limitations (for example, refer to JP 2015-128013 A).

[Other Negative Electrode Active Materials]

The carbon-based negative electrode active material that may optionally be contained in the presently disclosed slurry composition in addition to the LTO set forth above is an active material having carbon as a main framework into which lithium can be inserted (also referred to as "doping"). Examples of the carbon-based negative electrode active material include, but are not specifically limited to, carbon-based negative electrode active materials that can be produced through heat treatment of known carbon-based materials (for example, refer to JP 2015-128013 A).

The metal-based negative electrode active material (other negative electrode active material) is an active material that contains metal, the structure of which usually contains an element that allows insertion of lithium, and that exhibits a theoretical electrical capacity per unit mass of 500 mAh/g or more when lithium is inserted. Examples of the metal-based negative electrode active material include lithium metal; simple substances of metals that can form lithium alloys (for example, Ag, Al, Ba, Bi, Cu, Ga, Ge, In, Ni, P, Pb, Sb, Si, Sn, Sr, Zn, and Ti) and alloys thereof; and oxides, sulfides, nitrides, silicides, carbides, and phosphides of lithium metal, the simple substances of metals, and the alloys thereof.

It is preferable that 90 mass % or more of the negative electrode active material is LTO and more preferable that the negative electrode active material is LTO from a viewpoint of having small expansion and contraction associated with charging and discharging, high electrical potential, and so forth.

<Binder>

In a negative electrode produced by forming an electrode mixed material layer on a current collector using the slurry composition for a non-aqueous secondary battery negative electrode, the binder holds components contained in the electrode mixed material layer so that these components do not detach from the electrode mixed material layer. The binder also displays dispersing ability to enable good dispersion in the slurry composition of solid content, such as the negative electrode active material contained in the slurry composition and a conductive material that may optionally be contained in the slurry composition. The presently disclosed slurry composition for a non-aqueous secondary battery negative electrode contains at least a copolymer that includes a nitrile group-containing monomer unit and at least one selected from an aliphatic conjugated diene monomer unit and an alkylene structural unit and that has a Mooney viscosity ($ML_{1+4}$, 100° C.) of not less than 50 and not more than 200 as the binder, and may optionally further contain other polymers as the binder.

[Copolymer]

The copolymer is required to include a nitrile group-containing monomer unit and at least one selected from an aliphatic conjugated diene monomer unit and an alkylene structural unit as repeating units, and may optionally further include repeating units other than the aliphatic conjugated diene monomer unit, the alkylene structural unit, and the nitrile group-containing monomer unit (hereinafter, also referred to as "other repeating units").

Aliphatic Conjugated Diene Monomer Unit

Examples of aliphatic conjugated diene monomers that can form an aliphatic conjugated diene monomer unit include, but are not specifically limited to, 1,3-butadiene, 2-methyl-1,3-butadiene (isoprene), and 2,3-dimethyl-1,3-butadiene. Of these aliphatic conjugated diene monomers, 1,3-butadiene is preferable. One of these aliphatic conjugated diene monomers may be used individually, or two or more of these aliphatic conjugated diene monomers may be used in combination in a freely selected ratio.

Alkylene Structural Unit

The alkylene structural unit is a repeating unit composed only of an alkylene structure represented by a general formula $-C_nH_{2n}-$ (n is an integer of 2 or more). Although the alkylene structural unit may be linear or branched, the alkylene structural unit is preferably linear (i.e., the alkylene structural unit is preferably a linear alkylene structural unit) from a viewpoint of further improving slurry stability of the slurry composition. Examples of methods by which an alkylene structural unit can be introduced into the copolymer include, but are not specifically limited to, the following methods (1) and (2).

(1) A method involving producing a copolymer from a monomer composition containing an aliphatic conjugated diene monomer, and hydrogenating the resultant copolymer to convert an aliphatic conjugated diene monomer unit to an alkylene structural unit (2) A method involving producing a copolymer from a monomer composition containing a 1-olefin monomer The aliphatic conjugated diene monomer may be any of the aliphatic conjugated diene monomers listed as examples of aliphatic conjugated diene monomers that can form an aliphatic conjugated diene monomer unit. Of these aliphatic conjugated diene monomers, 1,3-butadiene is preferable. In other words, the alkylene structural unit obtained by method (1) is preferably a structural unit obtained through hydrogenation of an aliphatic conjugated diene monomer unit (i.e., a hydrogenated aliphatic conjugated diene unit), and is more preferably a structural unit obtained through hydrogenation of a 1,3-butadiene unit (i.e., a hydrogenated 1,3-butadiene unit). Selective hydrogenation of the aliphatic conjugated diene monomer unit can be carried out by a commonly known method such as an oil-layer hydrogenation method or a water-layer hydrogenation method.

Examples of the 1-olefin monomer include ethylene, propylene, 1-butene, and 1-hexene. Of these 1-olefin monomers, ethylene is preferable.

One of these aliphatic conjugated diene monomers or 1-olefin monomers may be used individually, or two or more of these aliphatic conjugated diene monomers or 1-olefin monomers may be used in combination.

The presently disclosed slurry composition is required to include at least one selected from an aliphatic conjugated diene monomer unit and an alkylene structural unit in the copolymer, but may include both an aliphatic conjugated diene monomer unit and an alkylene structural unit. As a result of the presently disclosed slurry composition containing the prescribed monomer units, dispersibility of solid content, such as a conductive material, in the slurry composition can be improved, and aggregation of solid content in the slurry composition can be inhibited. Accordingly, the presently disclosed slurry composition has high slurry viscosity stability and sedimentation resistance, and excellent slurry stability. When slurry stability is high, solid content concentration in the slurry can be increased to an appropriate level in adjustment of viscosity of the slurry composition to a viscosity that provides good coatability, and output characteristics of a secondary battery that is ultimately obtained can be enhanced. It is preferable that the presently disclosed slurry composition includes at least an alkylene structural unit. Output characteristics of an obtained secondary battery can be further improved when the slurry composition includes an alkylene structural unit.

The percentage content of the at least one selected from an aliphatic conjugated diene monomer unit and an alkylene structural unit in the copolymer when all repeating units (total of structural units and monomer units) in the copolymer are taken to be 100 mass % is preferably 20 mass % or more, more preferably 50 mass % or more, and even more preferably 55 mass % or more, and is preferably 80 mass % or less, and more preferably 70 mass % or less. Dispersibility of solid content in the slurry composition can be further improved by setting the percentage content of the at least one selected from an aliphatic conjugated diene monomer unit and an alkylene structural unit in the copolymer as not less than any of the lower limits set forth above. Supposing that the percentage content of the at least one selected from an aliphatic conjugated diene monomer unit and an alkylene structural unit is less than the lower limits set forth above, it would be necessary to lower the slurry concentration to enable good dispersion of solid content in the slurry composition because solid content dispersing ability of the binder becomes inadequate. However, a lower slurry concentration may lead to deterioration of battery characteristics such as output characteristics and cycle characteristics of a secondary battery produced using the slurry composition. For this reason, battery characteristics of a secondary battery can be improved by setting the percentage content of the at least one selected from an aliphatic conjugated diene monomer unit and an alkylene structural unit in the copolymer as not less than any of the lower limits set forth above. Moreover, by setting the percentage content of the at least one selected from an aliphatic conjugated diene monomer unit and an alkylene structural unit in the copolymer as not more than any of the upper limits set forth above, reduction in solubility of the copolymer in solvents such as N-methylpyrrolidone (NMP) can be inhibited and the copolymer can be caused to display an adequate dispersing effect with respect to solid content such as a conductive material. This enables further improvement of slurry viscosity stability.

Note that in a case in which the copolymer includes both an aliphatic conjugated diene monomer unit and an alkylene structural unit, the total proportion constituted by these units in the copolymer preferably satisfies any of the ranges set forth above. Moreover, in a case in which the copolymer includes both an aliphatic conjugated diene monomer unit and an alkylene structural unit, the content of the alkylene structural unit is preferably 15 or more times that of the aliphatic conjugated diene monomer unit, and more preferably 20 or more times that of the aliphatic conjugated diene monomer unit.

Nitrile Group-Containing Monomer Unit

The nitrile group-containing monomer unit is a repeating unit that is derived from a nitrile group-containing monomer. The copolymer can display excellent flexibility and binding capacity as a result of including the nitrile group-containing monomer unit. Accordingly, an electrode mixed material layer formed using the presently disclosed slurry composition for a non-aqueous secondary battery negative electrode can display excellent peel strength and flexibility, and battery characteristics of a secondary battery including a negative electrode that includes this electrode mixed material layer can be improved.

Examples of nitrile group-containing monomers that can form a nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these compounds, acrylonitrile and methacrylonitrile are preferable, and acrylonitrile is more preferable as a nitrile group-containing monomer from a viewpoint of increasing binding capacity of the copolymer.

One of these nitrile group-containing monomers may be used individually, or two or more of these nitrile group-containing monomers may be used in combination.

The percentage content of the nitrile group-containing monomer unit in the copolymer when all repeating units in the copolymer are taken to be 100 mass % is preferably 10 mass % or more, more preferably 20 mass % or more, and even more preferably 27 mass % or more, and is preferably 55 mass % or less, and more preferably 40 mass % or less. Binding capacity of the copolymer can be improved and peel strength of an electrode mixed material layer formed using the slurry composition can be sufficiently increased by setting the percentage content of the nitrile group-containing monomer unit in the copolymer as not less than any of the lower limits set forth above. Moreover, flexibility of the copolymer can be increased by setting the percentage content of the nitrile group-containing monomer unit in the copolymer as not more than any of the upper limits set forth above. This suppresses reduction in flexibility of an electrode mixed material layer formed using the slurry composition. Setting the percentage content of the nitrile group-containing monomer unit in the copolymer as not more than any of the upper limits set forth above can also inhibit excessive reduction of peel strength of an electrode mixed material layer formed using the slurry composition.

Other Repeating Units

No specific limitations are placed on other repeating units that may be included besides the aliphatic conjugated diene monomer unit, the alkylene structural unit, and the nitrile group-containing monomer unit described above. Examples of such other repeating units include repeating units derived from known monomers that are copolymerizable with the monomers described above, such as a (meth)acrylic acid ester monomer unit and a hydrophilic group-containing monomer unit. Moreover, such other repeating units may include an aromatic vinyl monomer unit derived from an aromatic vinyl monomer such as styrene, α-methylstyrene, butoxystyrene, or vinylnaphthalene.

One of these monomers may be used individually, or two or more of these monomers may be used in combination. In the present disclosure, "(meth)acryl" is used to indicate "acryl" and/or "methacryl".

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these (meth)acrylic acid ester monomers, n-butyl acrylate is preferable.

Examples of hydrophilic group-containing monomers that can form a hydrophilic group-containing monomer unit include polymerizable monomers that have a hydrophilic group. Specific examples of hydrophilic group-containing monomers include carboxy group-containing monomers, sulfo group-containing monomers, phosphate group-containing monomers, and hydroxy group-containing monomers.

Examples of carboxy group-containing monomers include monocarboxylic acids, derivatives of monocarboxylic acids, dicarboxylic acids, acid anhydrides of dicarboxylic acids, and derivatives of these dicarboxylic acids and acid anhydrides.

Examples of monocarboxylic acids include acrylic acid, methacrylic acid, and crotonic acid. Of these monocarboxylic acids, methacrylic acid is preferable.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid esters such as methyl allyl maleate, diphenyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methyl maleic anhydride, and dimethyl maleic anhydride.

Furthermore, an acid anhydride that produces a carboxy group upon hydrolysis can also be used as a carboxy group-containing monomer.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfo group-containing monomers include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^1—COO—(C_qH_{2q}O)_p—H$ (where p represents an integer of 2 to 9, q represents an integer of 2 to 4, and $R^1$ represents a hydrogen atom or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

The percentage content of such other repeating units in the copolymer is preferably 25 mass % or less, more preferably 10 mass % or less, and even more preferably 1 mass % or less, and it is particularly preferable that the copolymer does not include any of such other repeating units. In other words, the copolymer is preferably composed solely of the nitrile group-containing monomer unit and the at least one selected from an aliphatic conjugated diene monomer unit and an alkylene structural unit. This is because particularly good dispersion of solid content in the slurry can be achieved and slurry stability can be significantly increased by using a copolymer in which the percentage content of such other repeating units is low.

Mooney Viscosity ($ML_{1+4}$, 100° C.)

The Mooney viscosity ($ML_{1+4}$, 100° C.) of the copolymer is required to be not less than 50 and not more than 200, is preferably 70 or more, and more preferably 90 or more, and is preferably 160 or less, and more preferably 130 or less. If the Mooney viscosity of the copolymer is less than the lower limit set forth above, it is not possible to obtain a slurry composition in which an electrode active material and a conductive material are both favorably dispersed because dense materials such as the negative electrode active material sediment in the slurry composition. Moreover, if the Mooney viscosity is less than the lower limit set forth above, the slurry viscosity readily changes over time, and slurry stability cannot be sufficiently increased. On the other hand, if the Mooney viscosity of the copolymer is more than the upper limit set forth above, it becomes necessary to keep a low solid content concentration in the slurry composition in order to ensure dispersibility because it becomes difficult to achieve good dispersion of solid content such as an electrode active material and a conductive material in the slurry composition when the concentration of the copolymer in the slurry composition is high. Consequently, it is not possible to obtain a slurry composition in which an electrode active material and a conductive material are contained in high concentration while ensuring dispersibility. Moreover, if the concentration of solid content such as an electrode active material and a conductive material in the slurry composition is low, it is not possible to sufficiently enhance battery characteristics of a secondary battery including a negative electrode that includes an electrode mixed material layer formed using the slurry composition. By setting the Mooney viscosity of the copolymer within any of the ranges set forth above, suitable molecular chain spreading for dispersing an electrode active material and a conductive material can be obtained when the copolymer is used in a slurry composition, which enables further improvement of slurry stability of the slurry composition.

The Mooney viscosity of the copolymer can be adjusted by, for example, altering the chemical composition, structure (e.g., straight chain ratio), molecular weight, or gel content of the copolymer, the production conditions of the polymer (e.g., amount of chain transfer agent, polymerization temperature, and conversion rate at end of polymerization), and so forth. In one specific example, the Mooney viscosity of the copolymer is reduced in a situation in which the amount of chain transfer agent used in production of the copolymer is increased.

The iodine value of the copolymer is preferably less than 20 mg/100 mg, and more preferably less than 10 mg/100 mg. When the iodine value of the copolymer is less than any of the upper limits set forth above, the copolymer is stable in terms of chemical structure at high potential and electrode structure can be maintained even when cycling is performed over a long period, which means that a secondary battery having excellent cycle characteristics can be provided. The iodine value can be determined in accordance with JIS K6235; 2006.

[Production Method of Copolymer]

Although no specific limitations are placed on the production method of the copolymer set forth above, the copolymer may be produced, for example, by polymerizing a monomer composition containing the above-described monomers to obtain a copolymer, optionally in the presence of a chain transfer agent, and then hydrogenating the resultant copolymer.

Herein, the percentage content of each monomer in the monomer composition used to produce the copolymer can be set in accordance with the percentage content of each repeating unit in the copolymer.

The polymerization method is not specifically limited, and any of solution polymerization, suspension polymerization, bulk polymerization, and emulsion polymerization may be used. Moreover, ionic polymerization, radical polymerization, living radical polymerization, or the like may be adopted as the polymerization reaction.

Typical methods using catalysts (for example, refer to WO 2012/165120 A1, WO 2013/080989 A1, and JP 2013-8485 A) may be adopted as the hydrogenation method of the polymer without any specific limitations.

In a case in which a chain transfer agent is used in production of the copolymer, the amount of the chain transfer agent that is used per 100 parts by mass, in total, of monomers in the monomer composition is preferably 0.05 parts by mass or more, more preferably 0.15 parts by mass or more, and even more preferably 0.20 parts by mass or more, and is preferably 0.50 parts by mass or less, and more preferably 0.40 parts by mass or less. Examples of chain transfer agents that may be used in production of the copolymer include, but are not specifically limited to, t-dodecyl mercaptan, n-dodecyl mercaptan, and α-methylstyrene dimer. Of these chain transfer agents, t-dodecyl mercaptan is preferable. If the amount of chain transfer agent that is used is less than the lower limit set forth above, it may not be possible to sufficiently increase the solid content concentration of the negative electrode active material and the like in the slurry composition due to gelation of the polymer occurring in the slurry composition and dispersibility of the slurry decreasing, and thus it may not be possible to sufficiently improve battery characteristics. Moreover, if the amount of chain transfer agent that is used is more than the upper limit set forth above, polymerization yield of the copolymer may decrease, molecular weight of the obtained copolymer may decrease, the copolymer may not display sufficient solid content dispersing ability, and sedimentation resistance of the slurry composition may decrease.

[Other Polymers]

The binder may include other polymers in addition to the specific copolymer set forth above. In a case in which another polymer is also used as the binder, the other polymer may be mixed with the copolymer set forth above in production of the slurry composition for a secondary battery electrode.

Examples of other polymers that can function as the binder in conjunction with the copolymer set forth above include, but are not specifically limited to, polyacrylonitrile, poly(methyl methacrylate), and polymers including 80 mass % or more of fluorine atoms such as polyvinylidene fluoride.

The proportion constituted by other polymers in the binder per 100 mass %, in total, of the specific copolymer set forth above and other polymers included in the binder is preferably 95 mass % or less, and more preferably 60 mass % or less. If the proportion constituted by such other polymers in the binder is high, it may not be possible to obtain an adequate dispersing effect through the copolymer, and thus it may not be possible to obtain a slurry composition in which an electrode active material is dispersed in high concentration.

Particularly in a case in which a polymer including 80 mass % or more of fluorine atoms is used as another polymer, the percentage content thereof per 100 mass %, in total, of the binder is preferably 40 mass % or less, more preferably 20 mass % or less, and even more preferably 0 mass % (i.e., it is even more preferable that a polymer including 80 mass % or more of fluorine atoms is not included). For example, if the proportion constituted by polyvinylidene fluoride (one example of a polymer including 80 mass % or more of fluorine atoms) in the binder is more than 40 mass %, a dehydrofluorination reaction may occur with strongly alkaline LTO. As a consequence of a polyene produced through this reaction having double bonds, a crosslinked structure may be formed and polymer gelation may occur in the slurry composition, which may lead to an excessive increase in viscosity of the slurry composition. Accordingly, in a case in which a polymer including 80 mass % or more of fluorine atoms is used as another polymer, the proportion constituted by this other polymer in the binder is preferably 40 mass % or less from a viewpoint of inhibiting excessive increase in viscosity of the slurry composition and further increasing slurry stability.

<Binder Concentration in Slurry Composition>

The binder concentration in the presently disclosed slurry composition for a non-aqueous secondary battery negative electrode is, for example, preferably 0.5 mass % or more, and more preferably 1 mass % or more in terms of solid content, and is preferably 10 mass % or less in terms of solid content. Slurry stability can be further increased when the percentage content of the binder in the slurry composition is not less than any of the lower limits set forth above. Moreover, it is possible to avoid the proportion constituted by the binder in an electrode mixed material layer formed using the slurry composition becoming excessively large and to inhibit deterioration of battery characteristics of a secondary battery when the percentage content of the binder in the slurry composition is not more than the upper limit set forth above.

<Conductive Material>

A conductive material promotes electrical contact amongst the electrode active material. The presently disclosed slurry composition preferably contains a conductive material from a viewpoint of improving battery characteristics. Examples of conductive materials that may be used include conductive carbon materials such as carbon black (e.g., acetylene black, Ketjenblack® (Ketjenblack is a registered trademark in Japan, other countries, or both), and furnace black), graphite, carbon fiber, and carbon flakes; and fibers and foils of various metals. One of these conductive materials may be used individually, or two or more of these conductive materials may be used in combination.

The presently disclosed slurry composition preferably contains carbon fiber and/or carbon black as a conductive material, and more preferably contains both carbon fiber and carbon black as a conductive material. Carbon nanofiber such as carbon nanotubes or vapor-grown carbon fiber is preferably contained as the carbon fiber, and carbon nanotubes are more preferably contained as the carbon fiber. Moreover, acetylene black is more preferable as the carbon black. The combined use of carbon nanotubes and acetylene black is particularly preferable.

The BET specific surface area of the conductive material is preferably 35 $m^2/g$ or more, and is preferably 3,000 $m^2/g$ or less, and more preferably 2,000 $m^2/g$ or less. Secondary battery output characteristics can be improved when the BET specific surface area is not less than the lower limit set forth above. On the other hand, the dispersing effect of the binder on the conductive material can be increased and dispersibility of the slurry composition can be improved when the BET specific surface area is not more than any of the upper limits set forth above.

In a case in which the presently disclosed slurry composition contains carbon fiber and carbon black as a conductive material, the proportion constituted by the carbon fiber in the conductive material is preferably 10 mass % or more, and more preferably 20 mass % or more.

Even when a conductive material including a conductive carbon material such as carbon fiber or carbon black is used, good and stable dispersion of the conductive material can be achieved in the presently disclosed slurry composition for a secondary battery electrode as a result of the slurry composition containing the copolymer including at least one selected from an aliphatic conjugated diene monomer unit and an alkylene structural unit.

The percentage content of the conductive material in the slurry composition for a secondary battery electrode, in terms of solid content, is 0 mass % or more, preferably 0.1 mass % or more, and more preferably 1.5 mass % or more, and is preferably 20 mass % or less, more preferably 15 mass % or less, and even more preferably 10 mass % or less. Use of an excessive amount of conductive material may reduce viscosity stability of the slurry composition. Moreover, if an excessive amount of conductive material is used, it becomes necessary to reduce the amount of solid content other than the conductive material (i.e., the negative electrode active material) in order to maintain slurry stability. Consequently, it may not be possible to sufficiently increase the slurry concentration and to sufficiently improve battery characteristics.

<Solvent>

Organic solvents can be used as the solvent of the slurry composition for a non-aqueous secondary battery negative electrode without any specific limitations. Examples of organic solvents that may be used include alcohols such as methanol, ethanol, n-propanol, isopropanol, n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide polar organic solvents such as N,N-dimethylformamide and N-methylpyrrolidone (NMP); and aromatic hydrocarbons such as toluene, xylene, chlorobenzene, orthodichlorobenzene, and paradichlorobenzene. One of these solvents may be used individually, or two or more of these solvents may be used as a mixture. Of these solvents, NMP is preferable.

<Other Components>

The presently disclosed slurry composition for a non-aqueous secondary battery negative electrode may contain components such as a reinforcing material, a leveling agent, a viscosity modifier, and an additive for electrolyte solution in addition to the components set forth above. These other components are not specifically limited so long as they do not affect the battery reactions and may be selected from commonly known components such as those described in WO 2012/115096 A1. One of these components may be used individually, or two or more of these components may be used in combination in a freely selected ratio.

(Production Method of Slurry Composition for Non-Aqueous Secondary Battery Negative Electrode)

The presently disclosed method of producing a slurry composition is a method of producing a slurry composition for a non-aqueous secondary battery negative electrode containing a negative electrode active material, a binder, and an organic solvent. The presently disclosed method of producing a slurry composition, which is for producing the presently disclosed slurry composition such as set forth above, includes: a step A of mixing the binder and the organic solvent to obtain a mixture; and a step B of mixing the negative electrode active material and the mixture.

In step A, the binder and the optionally used conductive material are added to and mixed with the organic solvent. Through this step, these components are dissolved or dispersed in the organic solvent. Devices that can typically be used in mixing or kneading of a mixture containing a solvent and a solute may be used in this mixing without any specific limitations. Examples of such devices include a ball mill, a sand mill, a bead mill, a pigment disperser, a grinding machine, an ultrasonic disperser, a homogenizer, a planetary mixer, and a FILMIX.

In step B, the negative electrode active material is added to and mixed with the mixture obtained in step A. The method of mixing is not specifically limited and the same type of method as in step A may be adopted. By dissolving or dispersing the binder and the optional conductive material in the organic solvent in step A, prior to further mixing the negative electrode active material in step B, the negative electrode active material can be favorably dispersed in the slurry composition. Particularly in a case in which the presently disclosed slurry composition contains a conductive material, the conductive material can be favorably dispersed in the slurry composition and slurry stability can be further improved because the binder is adsorbed by the conductive material in step A.

(Negative Electrode for Non-Aqueous Secondary Battery)

The presently disclosed negative electrode for a non-aqueous secondary battery includes a current collector and an electrode mixed material layer formed on the current collector, wherein the electrode mixed material layer is formed using the slurry composition for a non-aqueous secondary battery negative electrode set forth above. In other words, the electrode mixed material layer contains at least an electrode active material and a binder that includes a copolymer. It should be noted that components contained in the electrode mixed material layer are components that were contained in the slurry composition for a non-aqueous secondary battery negative electrode set forth above. Moreover, the preferred ratio of these components in the electrode mixed material layer is the same as the preferred ratio of these components in the slurry composition.

The presently disclosed negative electrode for a non-aqueous secondary battery includes a dense electrode mixed material layer that is formed on the current collector using the presently disclosed slurry composition for a non-aqueous secondary battery negative electrode, which has an electrode active material dispersed in high concentration therein. Consequently, a secondary battery having excellent battery characteristics such as output characteristics can be obtained using this electrode.

<Production Method of Electrode>

The presently disclosed negative electrode for a non-aqueous secondary battery is produced, for example, through a step of applying the slurry composition set forth above onto a current collector (application step) and a step of drying the slurry composition that has been applied onto the current collector to form an electrode mixed material layer on the current collector (drying step).

[Application Step]

The slurry composition may be applied onto the current collector by a commonly known method without any specific limitations. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may be made of, for example, iron, copper, aluminum, nickel, stainless steel, titanium, tantalum, gold, or platinum. One of these materials may be used individually, or two or more of these materials may be used in combination in a freely selected ratio.

[Drying Step]

The slurry composition that has been applied onto the current collector may be dried by any commonly known method without any specific limitations. Examples of drying methods that can be used include drying by warm, hot, or low-humidity air; drying in a vacuum; and drying by irradiation with infrared light, an electron beam, or the like. Through drying of the slurry composition on the current collector in this manner, an electrode mixed material layer can be formed on the current collector to thereby obtain an electrode for a secondary battery that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector. Furthermore, in a case in which the electrode mixed material layer contains a curable polymer, the polymer is preferably cured after the electrode mixed material layer has been formed.

It should be noted that as a result of the electrode active material being favorably dispersed in high concentration in the presently disclosed slurry composition for a non-aqueous secondary battery negative electrode, an electrode mixed material layer formed using this slurry composition has sufficiently high density and the internal structure thereof is not easily damaged even when the electrode mixed material layer is subjected to a pressing process. Accordingly, the battery characteristics of a secondary battery can be sufficiently improved through use of the presently disclosed slurry composition for a secondary battery electrode even in a case in which a pressing process or the like is performed in electrode production.

(Non-Aqueous Secondary Battery)

The presently disclosed non-aqueous secondary battery includes a positive electrode, a negative electrode, a separator, and an electrolyte solution, wherein the presently disclosed negative electrode for a non-aqueous secondary battery is used as the negative electrode. The presently disclosed non-aqueous secondary battery has excellent battery characteristics such as cycle characteristics and output characteristics as a result of including the presently disclosed negative electrode for a non-aqueous secondary battery.

Although the following describes, as one example, a case in which the non-aqueous secondary battery is a lithium ion secondary battery, the presently disclosed non-aqueous secondary battery is not limited to the following example.

<Electrodes>

Known positive electrodes that are used in production of non-aqueous secondary batteries may be used as the positive electrode used in the presently disclosed non-aqueous secondary battery without any specific limitations. Specifically, a positive electrode obtained by forming an electrode mixed material layer on a current collector by a known production method may be used as the positive electrode.

<Electrolyte Solution>

The electrolyte solution is normally an organic electrolyte solution obtained by dissolving a supporting electrolyte in an organic solvent. The supporting electrolyte of a lithium ion secondary battery may, for example, be a lithium salt. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable, and $LiPF_6$ is particularly preferable as these lithium salts readily dissolve in solvents and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferred for their high dielectric constant and broad stable potential region, and a mixture of ethylene carbonate and ethyl methyl carbonate is more preferable.

The concentration of the electrolyte in the electrolyte solution can be adjusted as appropriate and is, for example, preferably 0.5 mass % to 15 mass %, more preferably 2 mass % to 13 mass %, and even more preferably 5 mass % to 10 mass %. Known additives such as fluoroethylene carbonate and ethyl methyl sulfone may be added to the electrolyte solution.

<Separator>

Examples of separators that can be used include, but are not specifically limited to, those described in JP 2012-204303 A. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in a secondary battery, and consequently increases the capacity per volume.

<Production Method of Non-Aqueous Secondary Battery>

The presently disclosed non-aqueous secondary battery may be produced, for example, by stacking the positive electrode and the negative electrode with the separator in-between, performing rolling, folding, or the like of the resultant laminate as necessary in accordance with the battery shape, placing the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to measure and evaluate the chemical composition, Mooney viscosity, and iodine value of a copolymer, the viscosity stability, sedimentation resistance, and solid content concentration of a slurry composition for a negative electrode, the peel strength of a negative electrode for a non-aqueous secondary battery, and the output characteristics and cycle characteristics of a secondary battery.

<Chemical Composition of Copolymer>

After coagulating 100 g of a water dispersion of a copolymer in 1 L of methanol, vacuum drying was performed for 12 hours at a temperature of 60° C. The proportions of repeating units included in the obtained copolymer were measured by $^1$H-NMR.

<Mooney Viscosity ($ML_{1+4}$, 100° C.) of Copolymer>

After coagulating a water dispersion of a copolymer in methanol, vacuum drying was performed for 12 hours at a temperature of 60° C. The Mooney viscosity ($ML_{1+4}$, 100° C.) was then measured in accordance with JIS K6300-1 at a temperature of 100° C. using 40 g of the obtained copolymer.

<Iodine Value of Copolymer>

After coagulating 100 g of a water dispersion of a copolymer in 1 L of methanol, vacuum drying was performed for 12 hours at a temperature of 60° C. The iodine value of the resultant dried copolymer was measured in accordance with JIS K6235 (2006).

<Viscosity Stability of Slurry Composition for Negative Electrode>

An obtained slurry composition for a negative electrode was loaded into a tightly sealed vessel and was stored for 5 days at 25° C. while being stirred using a mix rotor at a rotation speed of 60 rpm. A B-type viscometer (rotation speed: 60 rpm) was used to measure the viscosity $\eta_0$ of the slurry composition for a negative electrode prior to storage (straight after production) and the viscosity $\eta_1$ of the slurry composition for a negative electrode after being stored for 5 days. The viscosity stability was calculated by the following formula and was evaluated by the following standard. A viscosity stability value closer to 100% indicates better dispersion stability of a conductive material and the like.

Viscosity stability=$(\eta_1/\eta_0) \times 100\%$

A: Viscosity stability of not less than 90% and not more than 110%

B: Viscosity stability of not less than 80% and less than 90%

C: Viscosity stability of not less than 70% and less than 80%

D: Viscosity stability of less than 70% or more than 110%

<Sedimentation Resistance of Slurry Composition for Negative Electrode>

An obtained slurry composition for a negative electrode was left at rest without stirring and the occurrence of sedimentation of an electrode active material or the like was checked after the slurry composition had been left for 5 days at 25° C. Moreover, in cases in which sedimentation occurred, the slurry composition for a negative electrode was stirred in order to judge by eye whether redispersion was possible. Furthermore, the viscosity of the redispersed slurry composition for a negative electrode was evaluated by the same method as previously described for viscosity stability. An evaluation was made by the following standard.

A: No sedimentation

B: Sedimentation occurs but redispersion is achieved through stirring and viscosity recovers to within a range of not less than 80% and not more than 100% of initial viscosity C: Sedimentation occurs and although redispersion is achieved through stirring, viscosity recovers to less than 80% or more than 100% of initial viscosity D: Sedimentation occurs and redispersion is not achieved even through stirring <Solid Content Concentration of Slurry Composition for Negative Electrode>

Solid content concentration was determined for a slurry composition for a negative electrode that had been adjusted to a viscosity of 4,000 mPa·s as measured at 25° C. using a B-type viscometer (rotation speed: 60 rpm), and then the solid content concentration was evaluated by the following standard. A higher solid content concentration indicates that an electrode active material and a conductive material can be dispersed in higher concentration in the slurry composition for a negative electrode.

A: Solid content concentration of 55 mass % or more

B: Solid content concentration of not less than 50 mass % and less than 55 mass %

C: Solid content concentration of not less than 45 mass % and less than 50 mass %

D: Solid content concentration of less than 45 mass %

<Peel Strength of Negative Electrode for Non-Aqueous Secondary Battery>

A negative electrode web prepared in each example or comparative example was rolled using a roll press having a roll diameter of 300 mm under conditions of a load of 14 t and a pressing speed of 1,000 mm/min to prepare a sheet-like negative electrode for peel testing including a negative electrode mixed material layer of 2.0 g/cm³ in density on a current collector.

The prepared sheet-like negative electrode for peel testing was cut out as a rectangle of 1.0 cm in width by 10 cm in length to obtain a specimen (negative electrode for evaluation). The specimen was secured to a test stage with the surface at the negative electrode mixed material layer side facing upward. Next, cellophane tape (tape prescribed by JIS Z1522) was attached to the surface at the negative electrode mixed material layer side of the specimen. The cellophane tape was subsequently pulled from one end of the specimen in a direction at 180° (i.e., toward the other end of the specimen) and at a speed of 50 mm/min, and the stress when the cellophane tape was peeled was measured. This measurement was performed 10 times to obtain an average value of the stress. The average value was taken to be the peel strength (N/m) and was evaluated by the following standard. A larger peel strength indicates better close adherence strength between the negative electrode mixed material layer and the current collector.

A: Peel strength of 30 N/m or more

B: Peel strength of not less than 20 N/m and less than 30 N/m

C: Peel strength of not less than 10 N/m and less than 20 N/m

D: Peel strength of less than 10 N/m

<Output Characteristics of Secondary Battery>

In a 25° C. environment, a secondary battery prepared in each example or comparative example was constant-current charged at 0.2 C until the battery voltage reached 2.7 V and was then constant-voltage charged at 2.7 V until the charging current reached 0.02 C. Next, the secondary battery was constant-current discharged at 0.2 C in a 25° C. environment until the battery voltage reached 1.5 V, and the initial capacity of the secondary battery was measured. Thereafter, in a 25° C. environment, the secondary battery for which the initial capacity had been measured was constant-current charged at 0.2 C until the battery voltage reached 2.7 V and was then constant-voltage charged at 2.7 V until the charging current reached 0.02 C. Next, the secondary battery was constant-current discharged at 2 C in a 25° C. environment until the battery voltage reached 1.5 V, and the 2 C capacity of the secondary battery was measured. An output characteristic (={(2 C capacity)/(initial capacity)}×100%) was calculated and was evaluated by the following standard.

A: Output characteristic of 90% or more

B: Output characteristic of not less than 87% and less than 90%

C: Output characteristic of not less than 84% and less than 87%

D: Output characteristic of less than 84%

<Low-Temperature Cycle Characteristics>

In a −10° C. environment, a non-aqueous electrolyte battery prepared in each example or comparative example was constant-current charged at 1.0 C until the battery voltage reached 2.7 V and was then constant-voltage charged at 2.7 V until the charging current reached 0.02 C. Next, the battery was constant-current discharged at 1.0 C in a −10° C. environment until the battery voltage reached 1.5 V. This charge/discharge operation was repeated 100 times (100 cycles). A ratio of discharge capacity at the end of 100 cycles relative to discharge capacity at the end of 1 cycle was determined as a capacity maintenance rate ΔC (={(discharge capacity at end of 100 cycles)/(discharge capacity at end of 1 cycle)}×100%) and was evaluated by the following standard. A larger capacity maintenance rate ΔC indicates better high-voltage cycle characteristics.

A: Capacity maintenance rate ΔC of 90% or more
B: Capacity maintenance rate ΔC of not less than 85% and less than 90%
C: Capacity maintenance rate ΔC of not less than 80% and less than 85%
D: Capacity maintenance rate ΔC of less than 80%

Example 1

<Production of Copolymer>

An autoclave equipped with a stirrer was charged with 240 parts of deionized water, 2.5 parts of sodium alkylbenzene sulfonate as an emulsifier, 35 parts of acrylonitrile as a nitrile group-containing monomer, and 0.25 parts of t-dodecyl mercaptan as a chain transfer agent in this order. The inside of the autoclave was purged with nitrogen and then 65 parts of 1,3-butadiene as an aliphatic conjugated diene monomer was injected into the autoclave. In addition, 0.25 parts of ammonium persulfate as a polymerization initiator was added into the autoclave and a polymerization reaction was carried out at a reaction temperature of 40° C. Through this reaction, a copolymer of acrylonitrile and 1,3-butadiene was obtained. The polymerization conversion rate was 85%.

Deionized water was added to the resultant copolymer to obtain a solution adjusted to a total solid content concentration of 12 mass %. An autoclave of 1 L in capacity equipped with a stirrer was charged with 400 mL of the resultant solution (total solid content: 48 g), and nitrogen gas was passed through the solution for 10 minutes to remove dissolved oxygen present in the solution. Thereafter, 75 mg of palladium acetate as a hydrogenation reaction catalyst was dissolved in 180 mL of deionized water to which nitric acid had been added in an amount of 4 molar equivalents of the palladium (Pd), and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (first stage hydrogenation reaction) was performed for 6 hours.

The autoclave was subsequently returned to atmospheric pressure. Then, 25 mg of palladium acetate as a hydrogenation reaction catalyst was dissolved in 60 mL of deionized water to which nitric acid had been added in an amount of 4 molar equivalents of the Pd, and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (second stage hydrogenation reaction) was performed for 6 hours. The iodine value of the resultant copolymer as measured by the previously described method was less than 10 mg per 100 mg of the copolymer. The chemical composition and Mooney viscosity of the resultant copolymer were also measured. The results are shown in Table 1.

Next, the contents of the autoclave were returned to normal temperature and the system was converted to a nitrogen atmosphere. Thereafter, the contents were concentrated to a solid content concentration of 40% using an evaporator to yield a water dispersion of the copolymer.

<Production of Slurry Composition for Non-Aqueous Secondary Battery Negative Electrode>

A composition containing a copolymer including an alkylene structural unit (hydrogenated 1,3-butadiene unit) and a nitrile group-containing monomer unit (acrylonitrile unit) was obtained by adding 320 parts of N-methylpyrrolidone (NMP) as an organic solvent to 100 parts of the obtained water dispersion of the copolymer and then evaporating water under reduced pressure.

Moreover, 3.0 parts of acetylene black (BET specific surface area: 69 $m^2/g$) and 1.0 parts of carbon nanotubes as a conductive material, 4.0 parts in terms of solid content of the composition containing the copolymer, and N-methylpyrrolidone (NMP) as a solvent were mixed using a DISPER mixer to obtain a mixture. Next, 92.0 parts of $Li_4Ti_5O_{12}$ as a negative electrode active material was added to this mixture and was mixed therewith using a planetary mixer.

NMP was further added to the resultant mixture to adjust the viscosity to 4,000 mPa·s as measured by a B-type viscometer (rotation speed: 60 rpm) and thereby obtain a slurry composition for a negative electrode. The obtained slurry composition for a negative electrode was used to evaluate viscosity stability, sedimentation resistance, and solid content concentration. The results are shown in Table 1.

<Production of Negative Electrode for Non-Aqueous Secondary Battery>

Aluminum foil of 20 μm in thickness was prepared as a current collector. The obtained slurry composition for a negative electrode was applied onto one side of the aluminum foil such that the amount thereof after drying was 8.0 $mg/cm^2$, and was dried at 80° C. for 20 minutes and at 120° C. for 20 minutes to obtain a negative electrode web. This negative electrode web was rolled by roll pressing to produce a sheet-like negative electrode including the aluminum foil and a negative electrode mixed material layer of 2.0 $g/cm^3$ in density. The negative electrode web obtained in this manner was used to evaluate electrode peel strength. The results are shown in Table 1.

<Production of Positive Electrode for Non-Aqueous Secondary Battery>

A slurry composition for a positive electrode was obtained by mixing 96.0 parts of $LiCoO_2$ as a positive electrode active material, 2.0 parts of acetylene black (BET specific surface area: 69 $m^2/g$) as a conductive material, 2.0 parts of polyvinylidene fluoride (PVDF) as a binder for a positive electrode, and N-methylpyrrolidone (NMP) as an organic solvent using a planetary mixer. The obtained slurry composition for a positive electrode was applied onto one side of aluminum foil (current collector) of 20 μm in thickness using a comma coater such that the amount thereof after drying was 7.0 $mg/cm^2$, and was dried at 80° C. for 20 minutes and at 120° C. for 20 minutes to obtain a positive electrode web. The positive electrode web was rolled by roll pressing to produce a sheet-like positive electrode including the aluminum foil and a positive electrode mixed material layer of 3.6 $g/cm^3$ in density.

<Preparation of Separator for Non-Aqueous Secondary Battery>

A single-layered polypropylene separator (width: 65 mm; length: 500 mm; thickness: 25 μm; produced by dry method; porosity: 55%) was cut out as a 5 cm×5 cm square.

<Production of Non-Aqueous Secondary Battery>

An aluminum packing case was prepared as a battery case. The positive electrode obtained as described above was cut out as a 4 cm×4 cm square and was positioned such that the surface at the current collector side of the positive electrode was in contact with the aluminum packing case. The square separator obtained as described above was positioned on the positive electrode mixed material layer of the positive electrode. Moreover, the negative electrode obtained as described above was cut out as a 4.2 cm×4.2 cm square and was positioned on the separator such that the surface at the negative electrode mixed material layer side of the negative electrode faced the separator. The aluminum packing case was filled with an electrolyte solution composed of a $LiPF_6$ solution of 1.0 M in concentration. The solvent in the $LiPF_6$ solution was a mixed solvent of ethylene carbonate (EC) and ethyl methyl carbonate (EMC) (EC/EMC=3/7 (volume ratio)). The aluminum packing case was then closed by heat sealing at 150° C. to tightly seal an opening of the aluminum packing case, and thereby obtain a lithium ion secondary battery.

The obtained lithium ion secondary battery was used to evaluate output characteristics and low-temperature cycle characteristics. The results are shown in Table 1.

Example 2

A copolymer, a slurry composition for a negative electrode, a positive electrode, a negative electrode, and a secondary battery were produced in the same way as in Example 1 with the exception that carbon material-coated LTO particles prepared as described below were used in production of the negative electrode for a non-aqueous secondary battery. Evaluations were performed in the same way as in Example 1. The results are shown in Table 1.

<Preparation of Carbon Material-Coated LTO Particles>

After dissolving 9.2 kg of $LiOH.H_2O$ in 45 L of water, 20.8 kg of $TiO_2$ was added thereto. In addition, lactose was added in a ratio of 150 g per 1 kg, in total, of LiOH and $TiO_2$ to obtain a mixed liquid. The mixed liquid was spray dried using a spray dryer (produced by Nubilosa) under conditions of a start temperature of approximately 300° C. and an end temperature of 100° C. At first, porous spherical aggregates of several micrometers in size were formed.

Next, the obtained porous spherical aggregates were baked for 1 hour at 800° C. in a nitrogen atmosphere to obtain carbon material-coated LTO particles (LTO chemical composition: $Li_4Ti_5O_{12}$; total carbon content: 0.5 mass %).

Example 3

A copolymer, a slurry composition for a negative electrode, a positive electrode, a negative electrode, and a secondary battery were produced in the same way as in Example 1 with the exception that a copolymer including an aliphatic conjugated diene monomer unit that was produced as described below was used as the copolymer. Evaluations were performed in the same way as in Example 1. The results are shown in Table 1.

<Production of Copolymer Including Aliphatic Conjugated Diene Monomer Unit>

A reactor equipped with a stirrer was charged with 65 parts of 1,3-butadiene as an aliphatic conjugated diene monomer, 35 parts of acrylonitrile as a nitrile group-containing monomer, 2.5 parts of sodium alkylbenzene sulfonate as an emulsifier, 0.25 parts of t-dodecyl mercaptan as a chain transfer agent, 240 parts of deionized water, and 0.25 parts of ammonium persulfate as a polymerization initiator, and a polymerization reaction was carried out at a reaction temperature of 40° C. Through this reaction, a copolymer including a nitrile group-containing monomer unit (acrylonitrile unit) and an aliphatic conjugated diene monomer unit (1,3-butadiene unit) was obtained.

Examples 4 and 5

A copolymer, a slurry composition for a negative electrode, a positive electrode, a negative electrode, and a secondary battery were produced in the same way as in Example 1 with the exception that the amounts of 1,3-butadiene and acrylonitrile used in production of the copolymer were changed as indicated in Table 1. Evaluations were performed in the same way as in Example 1. The results are shown in Table 1.

Examples 6 and 7

A copolymer, a slurry composition for a negative electrode, a positive electrode, a negative electrode, and a secondary battery were produced in the same way as in Example 1 with the exception that the amount of t-dodecyl mercaptan used in production of the copolymer was changed as indicated in Table 1. Evaluations were performed in the same way as in Example 1. The results are shown in Table 1.

Example 8

A copolymer, a slurry composition for a negative electrode, a positive electrode, a negative electrode, and a secondary battery were produced in the same way as in Example 1 with the exception that in production of the copolymer, the amount of acrylonitrile was changed to 26 parts, 6 parts of methacrylic acid (hydrophilic group-containing monomer) was charged to the autoclave with the acrylonitrile, and the amount of 1,3-butadiene was changed to 68 parts. Evaluations were performed in the same way as in Example 1. The results are shown in Table 1.

Example 9

A copolymer, a slurry composition for a negative electrode, a positive electrode, a negative electrode, and a secondary battery were produced in the same way as in Example 1 with the exception that in production of the copolymer, the amount of acrylonitrile was changed to 30 parts, 10 parts of n-butyl acrylate as a (meth)acrylic acid ester monomer was charged to the autoclave with the acrylonitrile, and the amount of 1,3-butadiene was changed to 60 parts. Evaluations were performed in the same way as in Example 1. The results are shown in Table 1.

Example 10

A copolymer, a slurry composition for a negative electrode, a positive electrode, a negative electrode, and a secondary battery were produced in the same way as in Example 1 with the exception that a mixture of the copolymer and polyvinylidene fluoride as another polymer was used as a binder in production of the slurry composition for a non-aqueous secondary battery negative electrode, and the proportion in which the polyvinylidene fluoride was used was 30 mass % when the total of the copolymer and polyvinylidene fluoride was taken to be 100 mass %. Evaluations were performed in the same way as in Example 1. The results are shown in Table 1.

Comparative Example 1

A positive electrode, a negative electrode, and a secondary battery were produced in the same way as in Example 1 with the exception that a slurry composition for a non-aqueous secondary battery negative electrode was produced using poly(1,3-butadiene) as a binder without using the copolymer. Evaluations were performed in the same way as in Example 1. The results are shown in Table 1. Note that the poly(1,3-butadiene) was synthesized under the same conditions as in production of the copolymer in Example 3 with the exception that only 100 parts of 1,3-butadiene was used as monomer.

Comparative Examples 2 and 3

A copolymer and a slurry composition for a negative electrode were produced in the same way as in Example 1 with the exception that the amount of t-dodecyl mercaptan used in production of the copolymer was changed as indicated in Table 1. In Comparative Example 2, a positive electrode, a negative electrode, and a secondary battery were also produced, and evaluations were performed in the same way as in Example 1. In Comparative Example 3, electrode peel strength and secondary battery output characteristics and low-temperature cycle characteristics could not be evaluated because it was not possible to produce a negative electrode. The results are shown in Table 1.

In Table 1, shown below:

"$Li_4Ti_5O_{12}$/C" indicates carbon material-coated LTO particles;

"AceB" indicates acetylene black;

"CNT" indicates carbon nanotubes;

"BD" indicates 1,3-butadiene unit;

"AN" indicates acrylonitrile unit;

"BA" indicates n-butyl acrylate unit;

"MAA" indicates methacrylic acid unit;

"TDM" indicates t-dodecyl mercaptan; and

"PVDF" indicates polyvinylidene fluoride.

TABLE 1

| | | | Examples | | | | | | | | | | | Comparative Examples | | |
|---|---|---|---|---|---|---|---|---|---|---|---|---|---|---|---|---|
| | | | 1 | 2 | 3 | 4 | 5 | 6 | 7 | 8 | 9 | 10 | 1 | 2 | 3 |
| Slurry composition for non-aqueous secondary battery negative electrode | Active material | Type | $Li_4Ti_5O_{12}$ | $Li_4Ti_5O_{12}/C$ | $Li_4Ti_5O_{12}$ | $Li_4Ti_5O_{12}$ | $Li_4Ti_5O_{12}$ | $Li_4Ti_5O_{12}$ | $Li_4Ti_5O_{12}$ | $Li_4Ti_5O_{12}$ | $Li_4Ti_5O_{12}$ | $Li_4Ti_5O_{12}$ | $Li_4Ti_5O_{12}$ | $Li_4Ti_5O_{12}$ | $Li_4Ti_5O_{12}$ |
| | | Amount [parts by mass] | 92 | 92 | 92 | 92 | 92 | 92 | 92 | 92 | 92 | 92 | 92 | 92 | 92 |
| | Conductive material | AceB | 3 | 3 | 3 | 3 | 3 | 3 | 3 | 3 | 3 | 3 | 3 | 3 | 3 |
| | | CNT | 1 | 1 | 1 | 1 | 1 | 1 | 1 | 1 | 1 | 1 | 1 | 1 | 1 |
| | | CNT/(CNT+AceB) [%] | 25 | 25 | 25 | 25 | 25 | 25 | 25 | 25 | 25 | 25 | 25 | 25 | 25 |
| | | Amount (AceB+CNT) [parts by mass] | 4 | 4 | 4 | 4 | 4 | 4 | 4 | 4 | 4 | 4 | 4 | 4 | 4 |
| | Binder | (Copolymer) Amount of monomer [parts] — BD | 65 | 65 | 65 | 75 | 50 | 65 | 65 | 68 | 60 | 65 | 100 | 65 | 65 |
| | | AN | 35 | 35 | 35 | 25 | 50 | 35 | 35 | 26 | 30 | 35 | — | 35 | 35 |
| | | MAA | — | — | — | — | — | — | — | 6 | 10 | — | — | — | — |
| | | BA | — | — | — | — | — | — | — | — | — | — | — | — | — |
| | | Chemical composition of copolymer [mass %] — Alkylene structural unit | 62 | 62 | — | 72 | 48 | 62 | 62 | 65 | 58 | 62 | — | 62 | 62 |
| | | Aliphatic conjugated diene monomer unit | 3 | 3 | 65 | 3 | 2 | 3 | 3 | 3 | 2 | 3 | 100 | 3 | 3 |
| | | Nitrile group-containing monomer unit | 35 | 35 | 35 | 25 | 50 | 35 | 35 | 26 | 30 | 35 | — | 35 | 35 |
| | | Hydrophilic group-containing monomer unit | — | — | — | — | — | — | — | 6 | 10 | — | — | — | — |
| | | (Meth)acrylic acid ester monomer unit | — | — | — | — | — | — | — | — | — | — | — | — | — |

TABLE 1-continued

|  |  | Examples | | | | | | | | | | Comparative Examples | | |
| --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 1 | 2 | 3 |
|  | Amount of chain transfer agent (TDM) [parts by mass/100 parts by mass of monomer] | 0.25 | 0.25 | 0.25 | 0.25 | 0.25 | 0.45 | 0.1 | 0.25 | 0.25 | 0.25 | 0.25 | 0.02 | 0.8 |
|  | Mooney viscosity (ML$_{1+4}$, 100° C.) | 110 | 110 | 115 | 115 | 120 | 70 | 160 | 110 | 110 | 110 | 50 | 240 | 35 |
|  | Iodine value [mg/100 mg] | <10 | <10 | 200< | <10 | <10 | <10 | <10 | <10 | <10 | <10 | 200< | <10 | <10 |
|  | Other polymers | — | — | — | — | — | — | — | — | — | PVDF | — | — | — |
|  | Content ratio (other polymers/overall binder) [mass %] | — | — | — | — | — | — | — | — | — | 30 | — | — | — |
|  | Amount (in terms of solid content) [parts by mass] | 4 | 4 | 4 | 4 | 4 | 4 | 4 | 4 | 4 | 4 | 4 | 4 | 4 |
| Evaluation | Slurry viscosity stability | A | A | A | B | A | B | A | A | A | B | C | B | D |
|  | Slurry sedimentation resistance | A | A | A | B | A | B | A | A | A | A | B | B | D |
|  | Slurry concentration | A | B | B | A | B | A | B | A | A | C | D | D | D |
|  | Electrode peel strength | A | B | A | B | C | A | A | A | A | A | D | B | Not producible |
|  | Output characteristics | A | A | B | A | B | A | B | A | A | B | C | D | Not producible |
|  | Low-temperature cycle characteristics | A | A | B | A | B | A | B | A | A | B | C | D | Not producible |

It can be seen from Table 1 that slurry stability in terms of slurry viscosity stability and sedimentation resistance was high and a secondary battery having excellent output characteristics and cycle characteristics was obtained in each of Examples 1 to 10 in which the slurry composition for a non-aqueous secondary battery negative electrode that was used contained lithium titanium oxide as a negative electrode active material and a copolymer including a nitrile group-containing monomer unit and at least one selected from an aliphatic conjugated diene monomer unit and an alkylene structural unit and having a Mooney viscosity ($ML_{1+4}$, 100° C.) of not less than 50 and not more than 200 as a binder.

It can also be seen from Table 1 that when a slurry composition containing only a polymer that did not include a nitrile group-containing monomer unit as a binder (Comparative Example 1) or a slurry composition containing a copolymer that did not have the prescribed Mooney viscosity as a binder (Comparative Examples 2 and 3) was used, it was not possible to sufficiently increase slurry stability, and even when a secondary battery was formed in the case of Comparative Example 2, it was not possible to sufficiently enhance output characteristics and cycle characteristics of the obtained secondary battery.

INDUSTRIAL APPLICABILITY

According to the present disclosure, it is possible to provide a slurry composition for a non-aqueous secondary battery negative electrode that has high slurry stability and can sufficiently improve battery characteristics of a secondary battery and a method of producing this slurry composition for a non-aqueous secondary battery negative electrode.

Moreover, according to the present disclosure, it is possible to provide a negative electrode for a non-aqueous secondary battery that can sufficiently improve battery characteristics of a non-aqueous secondary battery and a non-aqueous secondary battery that has excellent battery characteristics such as output characteristics and cycle characteristics.

The invention claimed is:

1. A slurry composition for a non-aqueous secondary battery negative electrode comprising a negative electrode active material, a binder, and an organic solvent, wherein
the negative electrode active material includes lithium titanium oxide,
the binder includes a copolymer that includes a nitrile group-containing monomer unit and at least one selected from an aliphatic conjugated diene monomer unit and an alkylene structural unit and the copolymer has a Mooney viscosity $ML_{1+4}$, 100° C. of not less than 70 and not more than 200, and
the copolymer includes an alkylene structural unit in a proportion of not less than 65 mass % and has an iodine value of less than 10 mg/100 mg.

2. The slurry composition for a non-aqueous secondary battery negative electrode according to claim 1, wherein the proportion of the alkylene structural unit in the copolymer is not more than 80 mass %.

3. The slurry composition for a non-aqueous secondary battery negative electrode according to claim 1, further comprising a conductive material, wherein
the conductive material includes carbon fiber.

4. The slurry composition for a non-aqueous secondary battery negative electrode according to claim 1, wherein the copolymer includes the nitrile group-containing monomer unit in a proportion of not less than 10 mass % and not more than 35 mass %.

5. The slurry composition for a non-aqueous secondary battery negative electrode according to claim 1, wherein the binder includes a polymer including 80 mass % or more of fluorine atoms in a proportion of 40 mass % or less per 100 mass %, in total, of the binder.

6. The slurry composition for a non-aqueous secondary battery negative electrode according to claim 3, wherein the proportion of the alkylene structural unit in the copolymer is not more than 80 mass %.

7. A negative electrode for a non-aqueous secondary battery comprising an electrode mixed material layer formed on a current collector using the slurry composition for a non-aqueous secondary battery negative electrode according to claim 1.

8. A non-aqueous secondary battery comprising a positive electrode, a negative electrode, a separator, and an electrolyte solution, wherein
the negative electrode is the negative electrode for a non-aqueous secondary battery according to claim 7.

9. A method of producing a slurry composition for a non-aqueous secondary battery negative electrode containing a negative electrode active material, a binder, and an organic solvent, wherein
the negative electrode active material includes lithium titanium oxide,
the binder includes a copolymer that includes a nitrile group-containing monomer unit and at least one selected from an aliphatic conjugated diene monomer unit and an alkylene structural unit and the copolymer has a Mooney viscosity $ML_{1+4}$, 100° C. of not less than 70 and not more than 200, and
the copolymer includes an alkylene structural unit in a proportion of not less than 65 mass % and has an iodine value of less than 10 mg/100 mg,
the method of producing the slurry composition for a non-aqueous secondary battery negative electrode comprising:
a step A of mixing the binder and the organic solvent to obtain a mixture; and
a step B of mixing the negative electrode active material and the mixture.

* * * * *